United States Patent
Ekambaram et al.

(10) Patent No.: US 10,104,403 B1
(45) Date of Patent: Oct. 16, 2018

(54) SNIPPET AUGMENTATION FOR VIDEOS

(71) Applicant: International Business Machines Corporation, Armonk, NY (US)

(72) Inventors: Vijay Ekambaram, Chennai (IN); Ramasuri Narayanam, Guntur (IN); Nitendra Rajput, Gurgaon (IN); Yedendra B. Shrinivasan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/488,957

(22) Filed: Apr. 17, 2017

(51) Int. Cl.
| | |
|---|---|
| H04N 21/234 | (2011.01) |
| H04N 21/258 | (2011.01) |
| H04N 21/84 | (2011.01) |
| H04N 21/61 | (2011.01) |
| H04N 21/44 | (2011.01) |
| H04N 21/45 | (2011.01) |
| H04N 21/278 | (2011.01) |
| G06F 17/30 | (2006.01) |

(52) U.S. Cl.
CPC ... *H04N 21/23418* (2013.01); *G06F 17/3082* (2013.01); *G06F 17/30828* (2013.01); *H04N 21/25891* (2013.01); *H04N 21/278* (2013.01); *H04N 21/44008* (2013.01); *H04N 21/4532* (2013.01); *H04N 21/6125* (2013.01); *H04N 21/6175* (2013.01); *H04N 21/84* (2013.01)

(58) Field of Classification Search
CPC ....... H04N 21/23418; H04N 21/25891; H04N 21/84; H04N 21/6175; H04N 21/6125; H04N 21/44008; H04N 21/4532; H04N 21/278
See application file for complete search history.

(56) References Cited

U.S. PATENT DOCUMENTS

| | | |
|---|---|---|
| 7,523,138 B2 | 4/2009 | Gruhl et al. |
| 2013/0300759 A1 | 11/2013 | White |

OTHER PUBLICATIONS

P. Mell et al., "The NIST Definition of Cloud Computing", National Institute of Standards and Technology, Information Technology Laboratory, Sep. 2011, pp. 1-7.
wirewax.com, Wirewax, 2016. Web. Nov. 29, 2016. <http://www.wirewax.com/>.

(Continued)

*Primary Examiner* — Yassin Alata
(74) *Attorney, Agent, or Firm* — Law Office of Jim Boice

(57) ABSTRACT

A video augmenting computer augments a video with snippet information. The video augmenting computer transmits requests to multiple remote video reviewing computers for a video and a snippet to augment the video. The snippet provides additional information about a particular passage from the video, and each of the requests includes a request for a profile of a reviewer of the video who created the snippet. The video augmenting computer receives the video and multiple versions of the snippet that were created by different reviewers of the video, and then compares profiles of the different reviewers to a profile of a new viewer of the video. In response to the profile of the new viewer matching a profile of a particular reviewer from the different reviewers of the video, the video augmenting computer augments the video with the snippet that was created by the particular reviewer to create an augmented video.

20 Claims, 7 Drawing Sheets

(56) References Cited

OTHER PUBLICATIONS

Prasanna Bharti, "Fishtree: Adaptive Learning Combined With Powerful Analytics". Edtechreview (ETR), May 17, 2014. Web. Nov. 29, 2016. <http://edtechreview.in/news/1207-fishtree-adaptive-learning-combined-with-powerful-analytics>.
Andrew Angus, "Top Tools to Simplify Video Analytics". Swtich Video Productions, Inc., Jul. 10, 2012. Web. Nov. 29, 2016. <http://www.switchvideo.com/2012/07/10/top-tools-to-simplify-video-analytics/>.
Chen et al., "AR-Miner: Mining Informative Reviews for Developers From Mobile App Marketplace". Proceedings of the 36th International Conference on Software Engineering, Hyderabad, India, May 31-Jun. 7, 2014, pp. 767-778 (Abstract Only).
Serva et al., "Automatically Mining Negative Code Examples from Software Developer Q & A Forums". Fourth International Workshop on Software Mining (SoftMine) With ASE, Nov. 2015.
U.S. Appl. No. 15/208,776, filed Jul. 13, 2016.
U.S. Appl. No. 15/208,690, filed Jul. 13, 2016.

SNIPPET AUGMENTATION FOR VIDEOS

BACKGROUND

The present invention relates to the field of computers that are capable of displaying videos. More particularly, the present invention relates to augmenting computer videos with information obtained from distributed sources.

SUMMARY

In a computer-implemented method embodiment of the present invention, a video augmenting computer transmits a video to multiple reviewing computers along with a request for one or more snippets created by video reviewers who are using the multiple reviewing computers, which provide additional information about one or more video passages. The request also requests a video reviewer to provide a profile when returning the one or more snippets. The video augmenting computer receives one or more responses to the request that include the profile of the video reviewer of the video and the one or more snippets. The video augmenting computer receives, from a new viewer, a new request to view the video along with a new viewer profile and compares profiles associated with the one or more snippets to the new viewer profile. In response to the new viewer profile matching a profile associated with the one or more snippets, the video augmenting computer augments the video with the one or more snippets and transmits an augmented video to a client computer associated with the new request.

Other embodiments of the present invention include a computer system and a computer program product.

DETAILED DESCRIPTION

Figure 1:
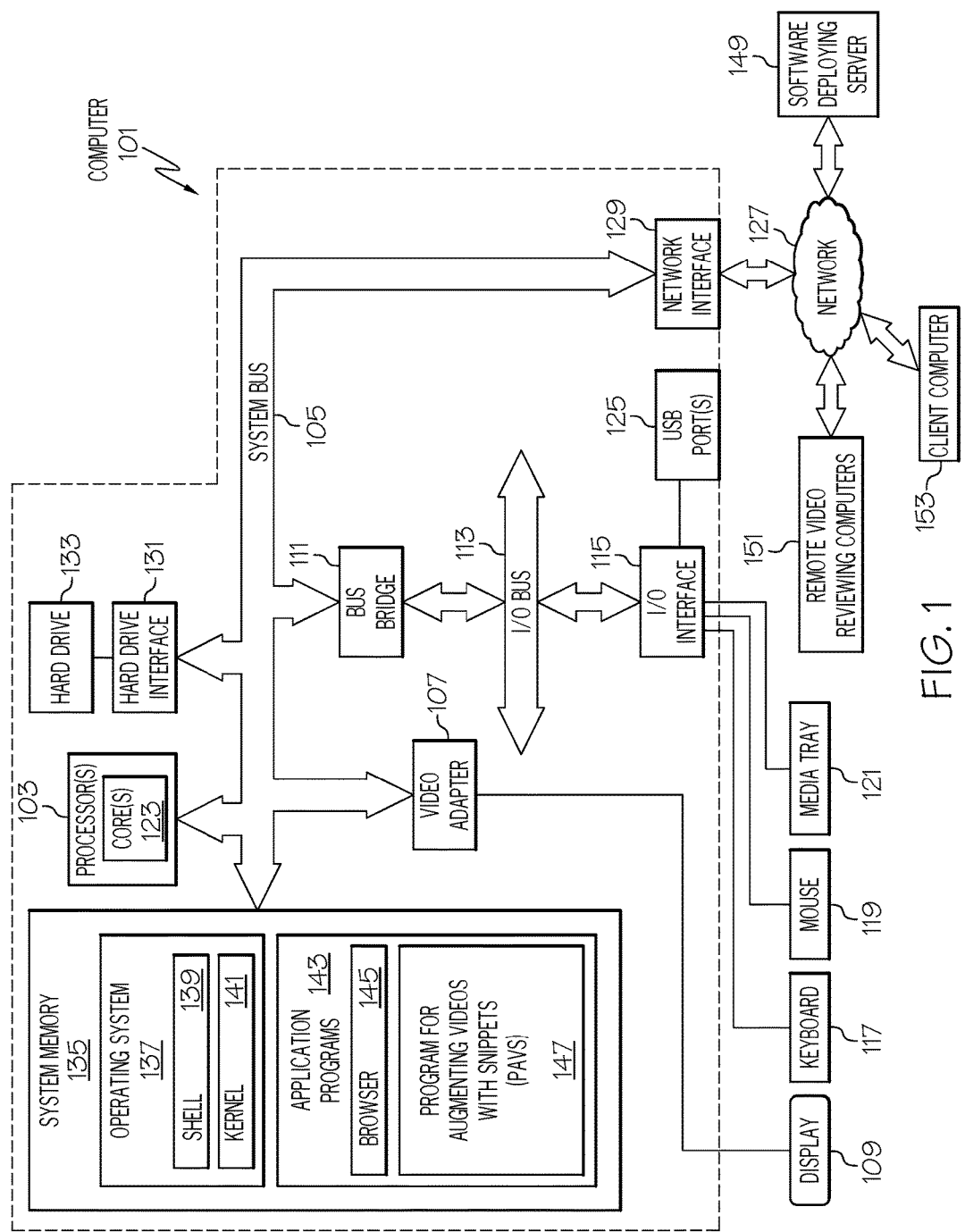
FIG. 1 depicts an exemplary system and network in accordance with one or more embodiments of the present invention.

With reference now to the figures, and in particular to FIG. 1, a block diagram of an exemplary system and network in accordance with one or more embodiments of the present invention is depicted. Some or all of the exemplary architecture, including both depicted hardware and software, shown for and within computer 101 can be utilized by: software deploying server 149 and/or remote video reviewing computers 151 and/or client computer 153 shown in FIG. 1; and/or video augmenting computer 401 and/or remote video reviewing computers 451a-451b and/or client computer 453 shown in FIG. 4.

With further reference to FIG. 1, exemplary computer 101 includes processor(s) 103, operably coupled to a system bus 105. Processor(s) 103 may embody or use one or more processor core(s) 123. A video adapter 107, which drives/supports a display 109, is also coupled to system bus 105. In one or more embodiments of the present invention, video adapter 107 detects (e.g., using inputs from keyboard 117 and/or mouse 119) that a user has paused, stopped, rewound, or otherwise interrupted the play of a video being shown on display 109.

System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one or more embodiments, some or all of these ports are universal serial bus (USB) ports.

As depicted, network interface 129 is also coupled to system bus 105. Network interface 129 can be a hardware network interface, such as a network interface card (NIC), etc. Computer 101 is able to communicate with a software deploying server 149 and/or remote video reviewing computers 151 via network interface 129 and network 127. Network 127 may include (without limitation) one or more external networks—such as a wide area network (WAN), and/or a network of networks such as the Internet—and/or one or more internal networks such as an Ethernet or a virtual private network (VPN). In one or more embodiments, network 127 includes a wireless network, such as a Wi-Fi network, and a cellular network. An example embodiment of the present invention utilizing a network "cloud" environment will be discussed with reference to FIGS. 6 and 7.

Referring again to FIG. 1, a hard drive interface 131 is also coupled to system bus 105. Hard drive interface 131 interfaces with a hard drive 133. In one embodiment, hard drive 133 is a non-volatile memory storage and populates a system memory 135 (e.g., random access memory (RAM)), which is also coupled to system bus 105. System memory may be considered a lowest level of volatile memory in computer 101. System memory 135 may include additional, higher levels of volatile memory (not shown), including, but not limited to, cache memory, registers and buffers. Data that populates system memory 135 includes computer 101's operating system (OS) 137 and application programs 143.

Operating system (OS) 137 includes a shell 139, for providing transparent user access to resources such as application programs 143. Generally, shell 139 is a program that provides an interpreter and an interface between the user and the OS. More specifically, shell 139 (sometimes referred to as a command processor) can execute commands entered into a command-line user interface or from a file. In other words, shell 139 can serve as a command interpreter. While shell 139 is a text-based, line-oriented user interface, the present invention will equally well support other user interface modes, such as graphical, voice, gestural, etc. As depicted, shell 139 can be considered the highest level of an OS software hierarchy. The shell can also provide a system prompt, interpret commands entered by keyboard, mouse, or other user input media, and send the interpreted command(s) to the appropriate (e.g., lower) levels of the operating system (e.g., a kernel 141) for processing.

As depicted, OS 137 also includes kernel 141, which includes (hierarchically) lower levels of functionality for OS 137. A few (non-limiting) examples of kernel functions include: providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions (not depicted) enabling a World Wide Web (WWW) client (i.e., computer 101) to send and receive network messages from network 127 (e.g., the Internet using hypertext transfer protocol (HTTP) messaging), thus enabling communication with software deploying server 149 and other systems.

In some embodiments, application programs 143 in computer 101's system memory include Program for Augmenting Videos with Snippets (PAVS) 147. In some embodiments, system memory 135 can be shared and/or application programs 143 distributed across one or more software deploying servers 149 or other systems (not depicted). In the example depicted, PAVS 147 includes program instructions (software) adapted for implementing processes and/or functions in accordance with the present invention, such as (without limitation) those described with reference to FIGS. 2-5. In some embodiments, PAVS 147 is downloaded from software deploying server 149, (on-demand or "just-in-time") e.g., where the PAVS 147 software is not downloaded until needed for execution. In some embodiments of the present invention, software deploying server 149 can perform all (or many) of the functions associated with the present invention (including execution of PAVS 147), thus freeing computer 101 from having to use its internal computing resources.

The hardware elements depicted in computer 101 are not intended to be exhaustive, but rather are representative to highlight essential components required by the present invention. For instance, computer 101 may include alternate memory storage devices such as flash memory, magnetic cassettes, digital versatile disks (DVDs), Bernoulli cartridges, and the like. These and other variations are intended to be within the spirit and scope of the present invention.

Users often watch videos on the World Wide Web (WWW), such as on video sharing websites. Such video sharing websites allow viewers of the videos to post opinions, questions, and other comments related to the videos. For example, previous viewers of a video may post comments stating that the video was unclear about a particular subject that is addressed in the video. However, comments of one or more previous viewers may not be useful to another (i.e., current) viewer of the video. For example, such prior viewers' comments may be above or below the level of expertise of the current viewer, and thus can be considered "clutter" that simply clogs up the feed and consumes unnecessary amounts of network bandwidth.

Similarly, comments from prior viewers may be unclear as to where in the video their comments are directed. For example, a prior viewer comment that "The presenter in the video is using an improper formula to explain how to reach the answer," can be considered unclear since it does not identify what "formula" is thought to be improper, and is too vague with regard to the "answer."

Thus, the current viewer may have to pause the video, use a search engine to look up additional information about a topic in the video that is unclear to the current viewer. Such searching can consume excessive resources of the current viewer's computer as well as the network (e.g., the Internet).

Some embodiments of the present invention provide an improvement to the function of the current viewer's computer as well as the network to which it is coupled. These improvements to the functionality of the current viewer's computer are the result of supplementing the video with independently obtained explanatory snippets, based on a match to the current viewer's profile. Furthermore, network bandwidth is reduced by 1) transmitting to the current viewer's computer only explanatory snippets that are appropriate for the current viewer; and 2) reducing, if not eliminating, network bandwidth consumption otherwise caused by the current viewer searching the Internet for clarifying information. Furthermore, the efficiency of the current viewer's computer can be improved by being able to efficiently display the video without interruption (e.g., to search for information on the Internet), since the explanatory snippets have pro-actively provided the information otherwise needed by the current viewer.

Figure 2:
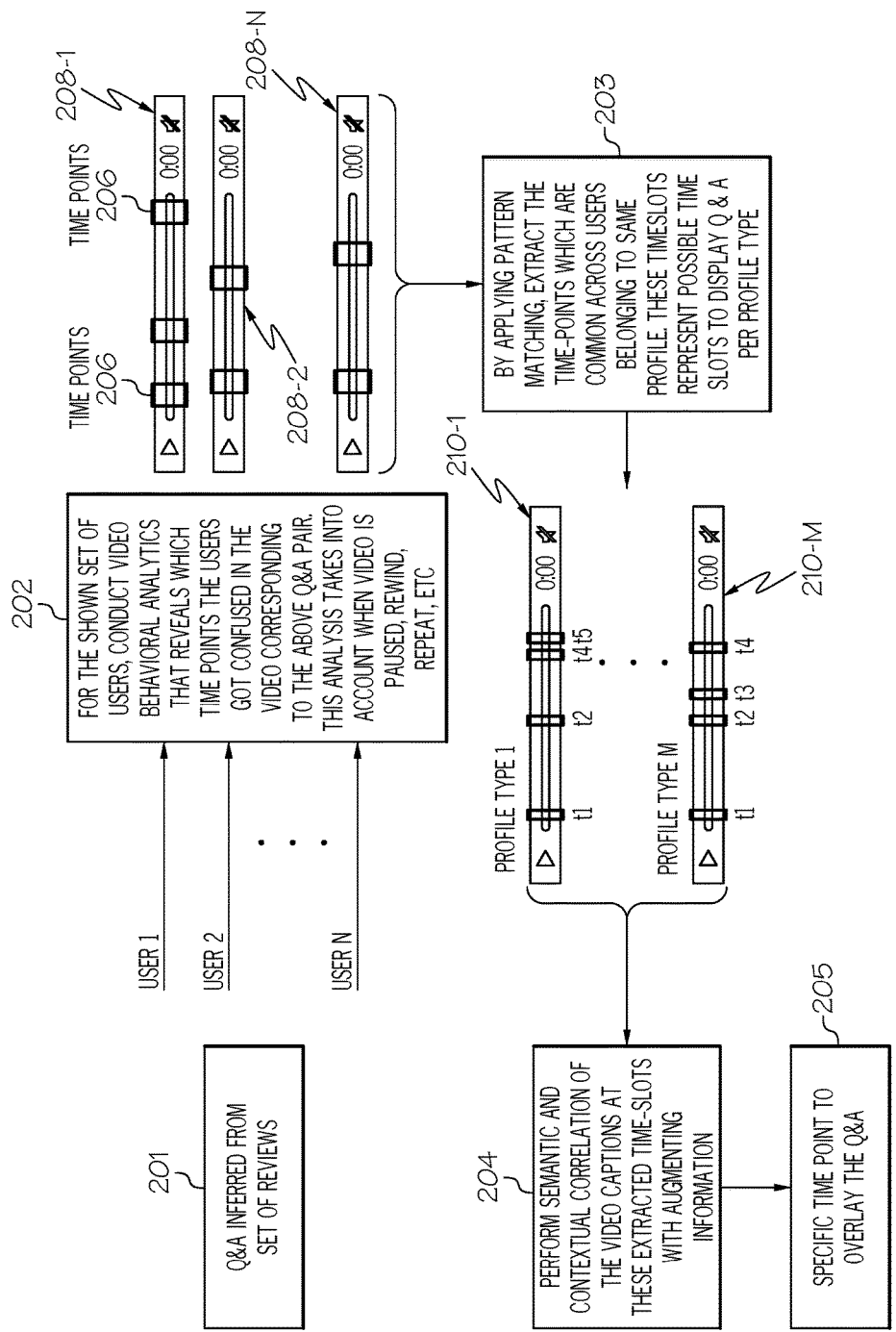
FIG. 2 illustrates an exemplary view of a system in accordance with one or more embodiments the present invention.

FIG. 2, depicts an exemplary view of a system in accordance with the present invention. As shown, in block 201, a set of comments/questions/feedback/etc. (e.g., comment 305 shown in FIG. 3) regarding a particular video (e.g., video 301*a* shown in FIG. 3) are created by multiple viewers (USER 1 . . . USER N) of that particular video. In some embodiments, the question and answer (Q&A) "inference" in block 201 establishes 1) which prior viewer posted the comment; 2) a profile of the prior viewer who posted the comment; and 3) the point in the video to which each comment is directed (i.e., time t1 in video 301*a* shown in FIG. 3).

Establishing 1) which prior viewer posted the comment can be ascertained by the name/identity of the viewer (e.g., "VIEWER X" in comment 305) who posted the comment. This information can be obtained by the posting viewer providing his/her name/pseudonym along with his/her posting.

Establishing 2) the profile of each of the prior viewers can be ascertained by matching the name/pseudonym of the posting viewer with a profile stored in a database. By way of example only, this database may be: co-resident with the video server that serves the video; reside in a "cloud" environment, such as the example discussed below with reference to FIG. 6 and FIG. 7; associated with a video augmenting computer (e.g., in the viewer profile database 403 depicted within video augmenting computer 401 shown in FIG. 4, etc.); or some combination of one or more of the foregoing.

Establishing 3) the point in the video to which each comment is directed can be ascertained either from the comment itself or from an action associated with the posting viewer. By way of example only, the posting viewer may provide a comment such as "At 10:25 into the video, the presenter refers to a "Monte Carlo simulation". A Monte Carlo simulation is a mathematical technique for predicting various outcomes according to their likelihood. Go to www-.montecarlosimulationlkjlk.com for further information about Monte Carlo simulations." (See comment 305 in FIG. 3.)

Referring again to FIG. 2, in block 202, once the above information is established about prior viewers of the video, video behavioral analytics may be performed. Such analytics may reveal points in time in the video that were confusing for the prior viewers. Such points in time may be identified based on when the video is paused, rewound, repeated, etc., or may be based on when question and answer exchanges (the "above Q&A pair") occurred among previous viewers. The time points are matched/correspond to the set of comments/questions/feedback/etc. available for the video, as established in block 201.

However, commenters often do not specify where their comment is directed. Thus, in an embodiment of the present invention, the commenting reviewer's computer will detect a disruption to the video to match a particular place in the video to the viewer's posting. For example, assume that the prior viewer of the video (i.e., the commenting reviewer) paused the video at the place in the video that is ten minutes, 25 seconds (10:25) from the beginning of the video. Assume further that while the video is paused at the 10:25 position, the prior viewer posted a comment: "The presenter refers to a "Monte Carlo simulation." A Monte Carlo simulation is a mathematical technique for predicting various outcomes according to their likelihood. Go to www.montecarlosimulationlkjlk.com for further information about Monte Carlo simulations".

Referring again to FIG. 2, User 1-User N (where "N" is an integer) may represent prior viewers who have paused, rewound, etc. the video at certain time points in the video. As depicted, User 1 has paused, rewound, repeated, etc. a passage from the video at time points 206, which are displayed on playbar 208-1. Similarly, User 2 has paused, rewound, repeated, etc. a passage from the video at two other time points (not labeled) shown on playbar 208-2, while User N has paused, rewound, repeated, etc. a passage from the video at two different time points (also not labeled) shown on playbar 208-N.

In block 203, a video augmenting computer matches the times at which viewers have paused, rewound, repeated, etc. a passage from the video to certain profile types. Let's assume that the presenter is a biologist and that the focus of the video is biology. Let's further assume that the video has been completely viewed by each of Users 1-N, and at a certain point (e.g., time t3 shown in FIG. 3) the presenter begins speaking about "Monte Carlo simulations." Assume also that the presenter is not an expert in predictions based on uncertainty and/or randomness, and more specifically is not familiar with "Monte Carlo simulations." Although User 1 is an expert in biology, the profile of User 1 is silent with regard to any interest or experience in the field of predictions based on uncertainty and/or randomness.

Referring specifically now to block 203 of this example (FIG. 2), a system (e.g., video augmenting computer 401 shown in FIG. 4) consolidates the timelines in playbars 208-1 to 208-N to create an augmented video represented by playbar 210-1 (with time points t1, t2, t4, and t5). The playbar 210-1 may be associated with future viewers (i.e., User 1) who are: 1) biologists; and 2) not experts in Monte Carlo simulations and/or predictions based on uncertainty and/or randomness; (collectively referred to as "Profile Type 1"). In other words, a version of the video represented by playbar 210-1 may be generated for and provided to future viewers that: have paused, rewound, repeated, etc. the video at times t1, t2, t4, and t5 of the video; and have a matching Profile Type 1.

Similarly, if one or more previous viewers of the video have a "Profile Type M", then the places in the video where they paused, rewound, repeated, etc. a passage from the video are shown as t1, t2, t3, and t4 of playbar 210-M.

It is to be understood that in this example, all of the playbars 208-1 through 208-N and 210-1 through 210-M are for a same video, which has been or will be viewed by different viewers.

Referring now to block 204 of this example (FIG. 2), a system (e.g., video augmenting computer 401 shown in FIG. 4) performs semantic and contextual correlations of the video captions at the extracted time slots (e.g., time points t1, t2, t4, and t5 of playbar 210-1) to identify/designate augmenting information. For example, assume that metadata from the video, and extracted text/speech from the video about biology is analyzed to reveal that at time t4 of the video the speaker is referring to Monte Carlo simulations. Assume further that User 1 paused the video at time t4, and added a comment (e.g., in the comment section of the video provider website) providing a brief explanation of Monte Carlo simulations discussed by the presenter at time t4 (e.g., as shown in block 305 of FIG. 3). Thus, the information in block 305 can be designated in block 204 as "augmenting information" for the presentation at time t4 in the video for future viewers of the video whose profile matches Profile Type 1. In other words, this augmenting information (comment 305) can be considered a snippet that is presented to future viewers of the video in order to further explain the content being presented at a certain time slot in the video.

Returning now to FIG. 2, in block 205, augmenting information is aligned to specific applicable points of the video, e.g., corresponding to time points on a playbar. Various methods (a few examples of which will be discussed below) can be used to identify snippets (e.g., comments, advice, links to other resources, etc.) relevant to a particular place (time slot) in the video (e.g., video 301a shown in FIG. 3).

In some embodiments of the present invention, snippets are ranked and assigned to a particular time slot (e.g., one of times t1-t5 shown in FIG. 2), using the following five steps.

Step 1. Identify a candidate snippet, such as a particular comment, an explanation, a question and answer pair, etc. that was generated by a previous viewer of the video.

Step 2. Identify all previous viewers who are associated with the identified candidate snippet. For example, if the snippet is the result of a question and answer pair, then any and all parties to that question and answer exchange are associated with the identified candidate snippet. By way of another example, if the identified candidate snippet is a comment, instruction, etc., then any previous viewer who commented on that identified candidate snippet is associated with the identified candidate snippet. That is, the identified candidate snippet is for a same segment of the video that was commented upon by another viewer.

Step 3. For all identified associated parties from Step 2, conduct video behavioral analytics that reveal the time points at which these associated viewers may have become confused in the video e.g., based on (at least in part) when the video is paused, rewound, repeated, etc.

Step 4. By applying pattern matching, extract the time-points (extracted from Step 3) that are common across users belonging to a same profile. These time slots represent possible time slots to display snippets according to profile types.

Step 5. Given a new user who will be watching the video, identify the specific profile type that this new viewer belongs to. Thereafter, extract those time points that suggest confusion for that specific profile type and conduct a semantic and contextual comparison of these time points with the snippets. The snippets are then ranked according to their relevance to particular time points in the video, resulting in a ranked list of snippets and time slots for each profile type.

In some embodiments of the present invention, a profile type of a new viewer of the video may be matched with one or more prior viewers/reviewers due to similarities with previous viewers (e.g., asking similar/same questions as previous viewers, profile contains same/similar areas of expertise, etc.) In some embodiments, a profile type of a new viewer and a particular prior viewer/reviewer may be matched when the video augmenting computer ascertains that the particular prior reviewer has provided/created a snippet that is relevant to viewers with the profile type of the new viewer. That is, while the prior reviewer may share some similarities with the profile of the new viewer, the profile and/or analysis of the particular reviewer may additionally reveal that pausing/rewinding/repeating/etc. the video was performed at the same time point(s). However, although the prior reviewer and new viewer may have paused the video at the same times, confusion was not necessarily the cause in both cases. The prior reviewer may instead have paused the video to prepare a helpful snippet (comment, advice, a link to resources, etc.), and the relevance of the identified snippet resulted in this prior reviewer's profile being matched to the profile of the new viewer.

Figure 3:
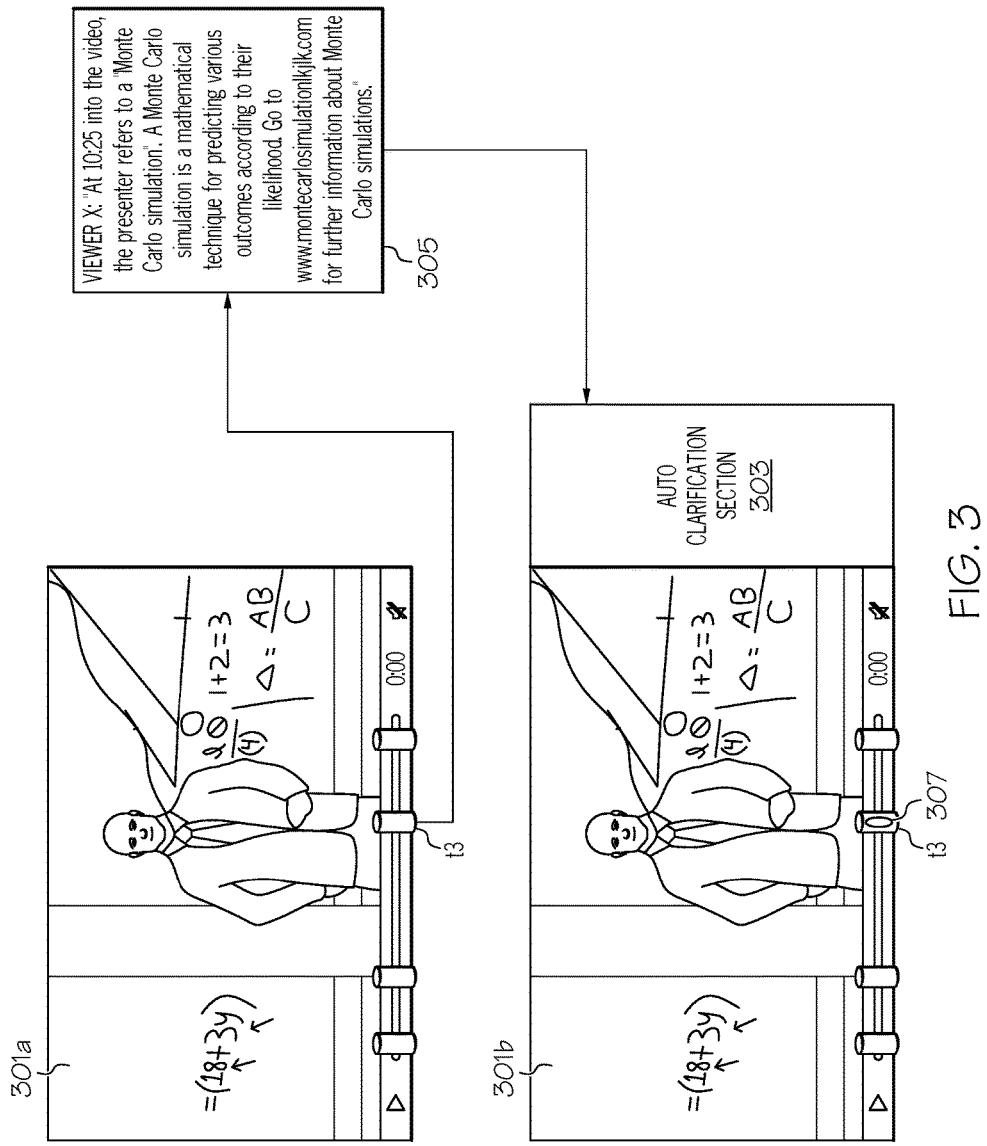
FIG. 3 depicts an exemplary video that has been augmented in accordance with one or more embodiments of the present invention.

As mentioned above, various methods can be used to identify relevant and insightful snippets (e.g., comments, advice, links to other resources, etc.) for a particular place (time slot) in the video (e.g., video 301a shown in FIG. 3). For example, if the snippet is a comment on a certain passage in the video, then that comment/snippet is compared to other comments/snippets about that passage. All of these comments/snippets can be input to a neural probabilistic language model, which quantifies the words and phrases in the comments/snippets in order to establish their proximity in a vector space found in a neural network (n-space). An exemplary process uses a term frequency-inverse document frequency (tf-idf) algorithm that weights words in the comments/snippets according to how often they appear. Thus, if the passage in the video is related to "simulations" and the term "simulation" occurs multiple times in a comment from a previous viewer, then the tf-idf algorithm will give that comment an appropriately higher ranking than a comment with fewer occurrences of the term. In other words, the snippets are converted into vectors that can be plotted in an n-space, such that those vectors that are within a certain proximity in the n-space are deemed to be sufficiently closely related to be appropriate for a particular type of viewer (based on that type of viewer's profile). That is, if two vectored passages are sufficiently close together, then they are both going to be useful for a same type of future viewer.

Figure 4:
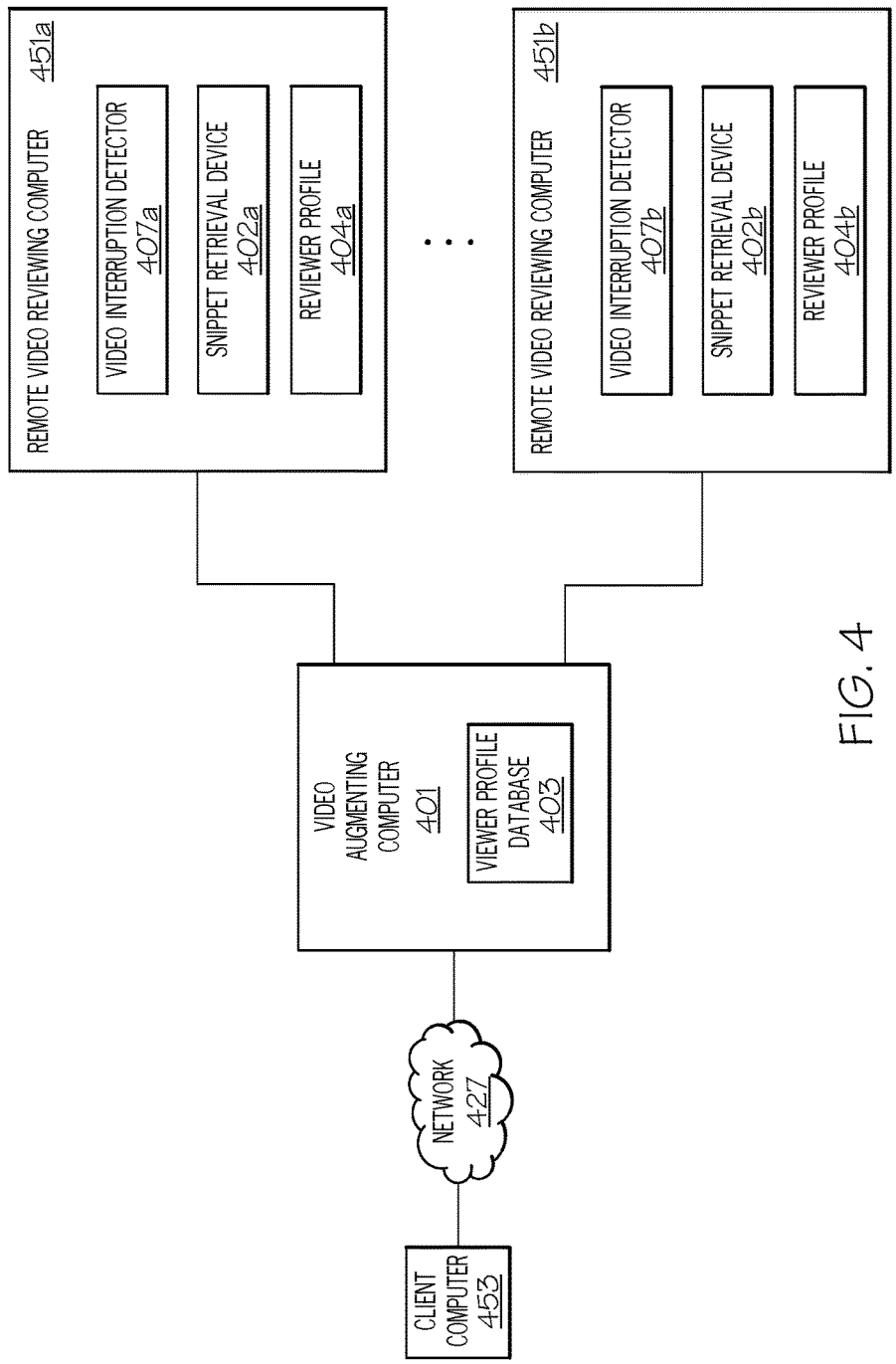
FIG. 4 illustrates an exemplary relationship between a video augmenting computer and multiple remote video reviewing computers, in accordance with one or more embodiments of the present invention.

FIG. 4 illustrates an exemplary relationship between a video augmenting computer and multiple remote video reviewing computers, in accordance with one or more embodiments of the present invention. By way of overview to the example depicted, remote video reviewing computers 451a-451b (where "b" is an integer and analogous to remote video reviewing computers 151 shown in FIG. 1) initially displayed the video (e.g., video 301a shown in FIG. 3) and generated (or retrieved as applicable) the augmentation comments/information. By way of further example, the video is augmented with snippets, such as the comment 305 of FIG. 3, by video augmenting computer 401. Video augmenting computer 401 coordinates/aligns the snippets/comments generated by the remote video reviewing computers 451a-451b by aligning these snippets with a particular time in the video based on viewer profiles, e.g., as previously discussed with reference to the examples of FIG. 2 and FIG. 3. The augmented video (e.g., video 301b shown in FIG. 3) is communicated and displayed to a subsequent viewer via network 427 and client computer 453. Referring now to FIG. 4, each of the remote video reviewing computers 451a-451b include snippet retrieval devices 402a-402b, reviewer profiles 404a-404b and video interruption detectors 407a-407b.

Video interruption detector 407a can be a component of video adapter 107 (shown in FIG. 1), which is able to detect when a video is paused, replayed, or otherwise interrupted by the viewer. Snippet retrieval devices 402a-402b may be hardware devices (e.g., a combination of processor(s) 103, hard drive interface 131, hard drive 133, and/or system memory 135 shown in FIG. 1) that retrieve augmentation information created by prior viewers of the video. This augmentation information (presented as "snippets" in the auto clarification section 303 in FIG. 3) may be stored in the hard drive 133, system memory 135, etc. of the remote video reviewing computers 451a-451b. That is, comments/links/etc. created by a user of remote video reviewing computer 451a are retrieved by snippet retrieval device 402a from storage within remote video reviewing computer 451a. Reviewer profiles 404a-404b may be profiles of reviewers of the video (and thus users of the respective remote video reviewing computers 451a-451b) that created a snippet (e.g., a comment, instruction, link to a resource, etc.) about a particular passage in the video.

In one or more embodiments of the present invention, a profile identifier (e.g., "Profile Type 1" shown in FIG. 2) is appended to the augmented video 301b. Thus, when video augmenting computer 401 receives a request from client computer 453 for the video in a version that is appropriate for a viewer matching "Profile Type 1", then only the augmented video 301b for viewers having "Profile Type 1" is sent to the client computer 453. As such, the client computer 453 (which is used by a person who later views the video that was shown previously on remote video reviewing computers 451a-451b) only receives from the video augmenting computer 401 the augmented video appropriate for his/her profile (e.g., augmented video 301b in FIG. 3). Thus, the client computer 453 may display the augmented video for a user having a certain profile without any modifications or interruptions, thereby improving the efficiency of client computer 453 and the smooth display of the video. Furthermore, client computer 453 may not be not slowed down while the user looks up certain concepts, to the extent that such concepts are already displayed in the augmented video 301b, thereby further improving the operation of the client computer 453 since no additional resources are used by the new viewer, e.g., using a search engine to look up certain concepts, information, etc. discussed in the video. Further still, network 427 (analogous to network 127 shown in FIG. 1) bandwidth can be conserved since only the augmented video 301b need be conveyed to the client computer 453, without one or more of the profiles, timelines, etc. generated by the various remote video reviewing computers 451a-451b, thereby improving the operation of network 427.

Figure 5:
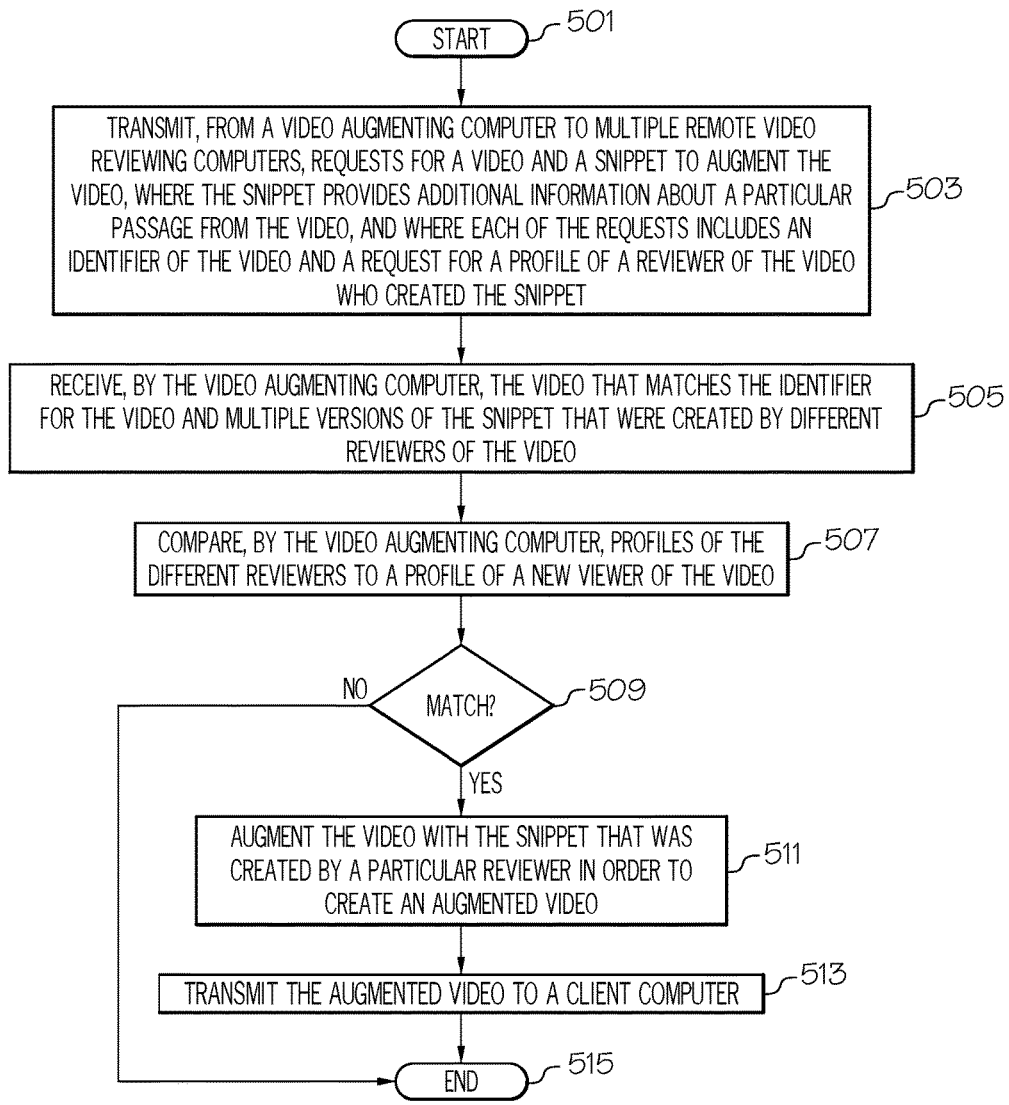
FIG. 5 depicts an exemplary method in accordance with one or more embodiments of the present invention.

FIG. 5 depicts an exemplary method in accordance with one or more embodiments of the present invention. In this example, an identifier is associated with each video. As depicted, the method begins with initiator (start) block 501 and proceeds to block 503. In block 503, a video augmenting computer (e.g., video augmenting computer 401 shown in FIG. 4) transmits a video (e.g., video 301a shown in FIG. 3) to multiple remote video reviewing computers (e.g., remote video reviewing computers 451a-451b shown in FIG. 4) along with a request for a snippet to augment the video and a profile of the reviewer who created the snippet. In this example, the requested snippet is to provide additional information about a particular passage from the video. In other words, each request not only identifies which video is being requested (e.g., video 301a), but also requests a profile (e.g., "Profile Type 1" shown in FIG. 2) of the reviewer who created the snippet (e.g., the previous viewer who wrote a comment about a certain passage from the video).

In block 505, the video augmenting computer receives multiple versions of the (augmented) video that match the identifier for the video. The multiple versions of the received video contain different snippets created by different reviewers of the video and various profiles corresponding to the reviewers. As is mentioned below, one or more of such profiles may (or may not) match the profile of a new viewer of the video.

In block 507, in response to a request for a version of the video that is appropriate for a new viewer corresponding to a particular profile, the video augmenting computer compares profiles of the different reviewers to the profile of the new viewer of the video. If the profile of the new viewer matches a profile of a particular reviewer from the different reviewers of the video (query block 509), then the video augmenting computer augments the video with the first snippet that was created by the particular reviewer in order to create an augmented video, as described in block 511. If the profile of the new viewer does not match a profile of a particular reviewer from the different reviewers of the video, the method proceeds to block 515.

As depicted in block 513, the video augmenting computer then transmits the augmented video to a client computer for display on the client computer.

The flow chart ends at terminator block 515.

By way of further example, in some embodiments of the present invention, assume that the video augmenting computer receives a second snippet that matches the identifier of the video and (in block 509) matches the profile of the new viewer of the video. Assume further (for purposes of this example only), that a first snippet was created on a first remote video reviewing computer (e.g., remote video reviewing computer 451*a* shown in FIG. 4), while the second snippet was created on a different remote video reviewing computer (e.g., remote video reviewing computer 451*b* shown in FIG. 4). In this example, the first snippet provides information about a particular passage from the video and the second snippet provides additional information about the same particular passage from the video. The second snippet is received by video augmenting computer (e.g., video augmenting computer 401 shown in FIG. 4) from the second remote video reviewing computer. The video augmenting computer then further augments the video (already augmented with the first snippet) by supplementing the first snippet with the additional information contained in the second snippet. The further augmented video (with the combined snippets) is then transmitted to the client computer for display. For example, comment 305, which is displayed in the auto clarification section 303 shown in FIG. 3 when the progress button 307 reaches time t3 on video 301*b*, reflects a modification of the first snippet based on another comment (the second snippet) from another reviewer.

By way of an alternative to the above exemplary combination of snippets, the video augmenting computer may further augment the augmented video by replacing the first snippet with the second snippet to create a further augmented video, which is transmitted to the client computer for display. In other words, rather than combine two snippets as described above, the first snippet is deleted and replaced with the second snippet, and the second snippet (but not the first snippet) is presented in the auto clarification section 303 shown in FIG. 3 when the progress button 307 reaches time t3 on video 301*b*.

In some embodiments of the present invention, the first snippet is text that provides additional information about a particular passage from the video. In some embodiments, the first snippet is a link to another video that provides additional information about a particular passage from the video. In some embodiments, the first snippet is generated in response to the first remote video reviewing computer pausing the video at the particular passage. That is, when a reviewer of the video pauses the video at a particular place on the video, he/she generates the first snippet (e.g., comment 305 shown in FIG. 3) for that particular place on the video.

In some embodiments of the present invention, the first snippet is generated in response to the first remote video reviewing computer rewinding the video at the particular passage. That is, when a reviewer of the video rewinds the video at or to a particular spot on the video, then he/she generates the first snippet (e.g., comment 305 shown in FIG. 3) for that particular spot on the video. In some embodiments, the first snippet is generated in response to the first remote video reviewing computer repeating the video at the particular passage. That is, when a reviewer of the video replays a certain passage of the video, he/she generates the first snippet (e.g., comment 305 shown in FIG. 3) for that certain passage that is being replayed/repeated.

In some embodiments, generation of the first snippet in auto clarification section 303 causes the first remote video reviewing computer to automatically pause the video, to allow the reviewer of the video unlimited time in which to read/play/review the content of the first snippet. In some embodiments, generation of the first snippet into auto clarification section 303 causes the first snippet to be held in view while the video continues to play, until the video is manually paused/stopped/rewound/repeated/etc. by the reviewer of the video and the snippet is read/played/reviewed by the reviewer at a time point of his choosing.

One or more embodiments of the present invention may be implemented in a cloud computing environment. Nonetheless, it is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
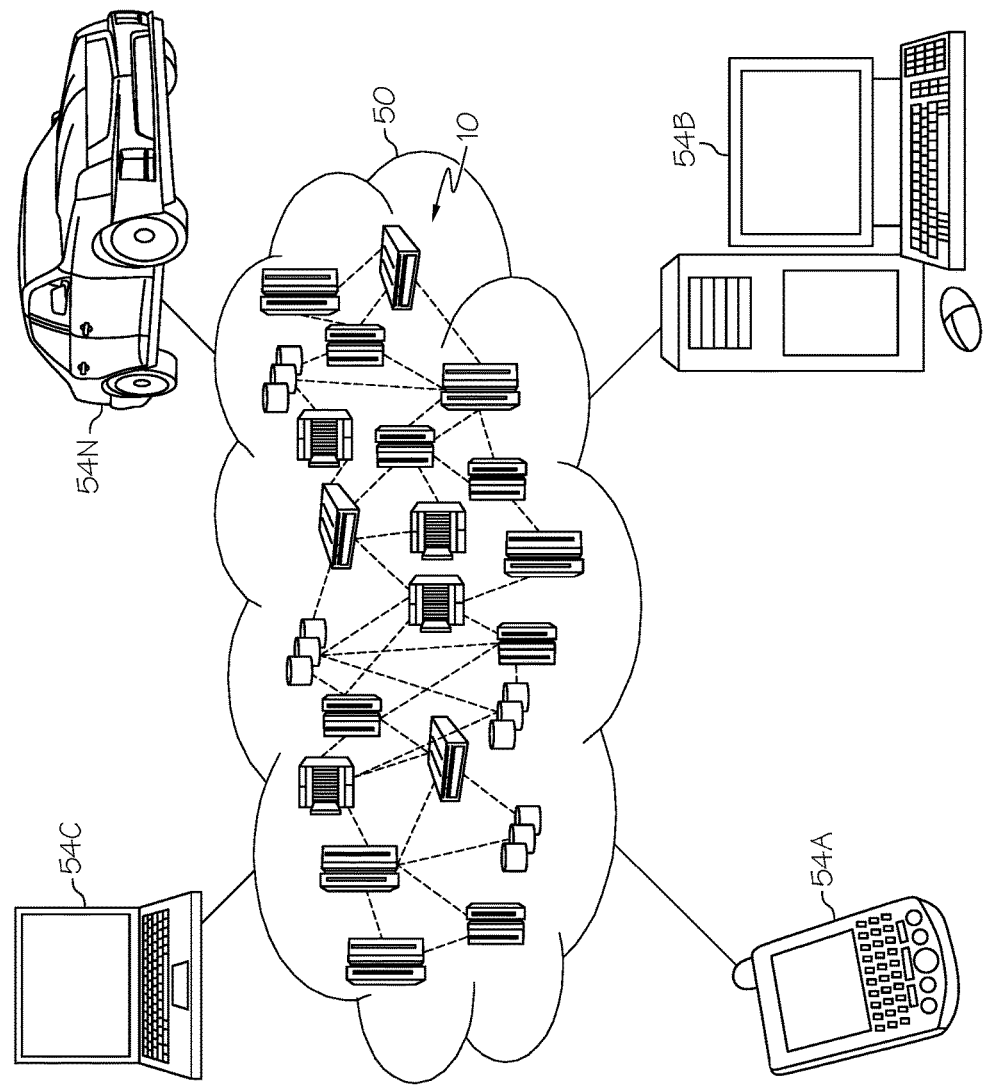
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. By way of example only, local computing devices may include one or more features and/or functions of computer 101, remote video reviewing computers 151, 451a-b and/or client computer 153, 453 (described with reference to FIG. 1 and/or FIG. 4). Nodes 10 may communicate with one another. By way of example only, one or more of nodes 10, may include one or more features and/or functions of computer 101, and/or video augmenting computer 401 (described with reference to FIG. 1 and/or FIG. 4). Nodes 10 may be grouped (not shown) physically or virtually, in one or more networks, such as Private, Community, Public, or Hybrid clouds as described hereinabove, or a combination thereof. This can allow cloud computing environment 50 to offer infrastructure, platforms and/or software as services for which a cloud consumer does not need to maintain resources on a local computing device. It is understood that the types of computing devices 54A-54N and nodes 10 shown in FIG. 6 are intended to be illustrative only and further that computing nodes 10 and cloud computing environment 50 can communicate with any type of computerized device over any type of network and/or network addressable connection (e.g., using a web browser).

Figure 7:
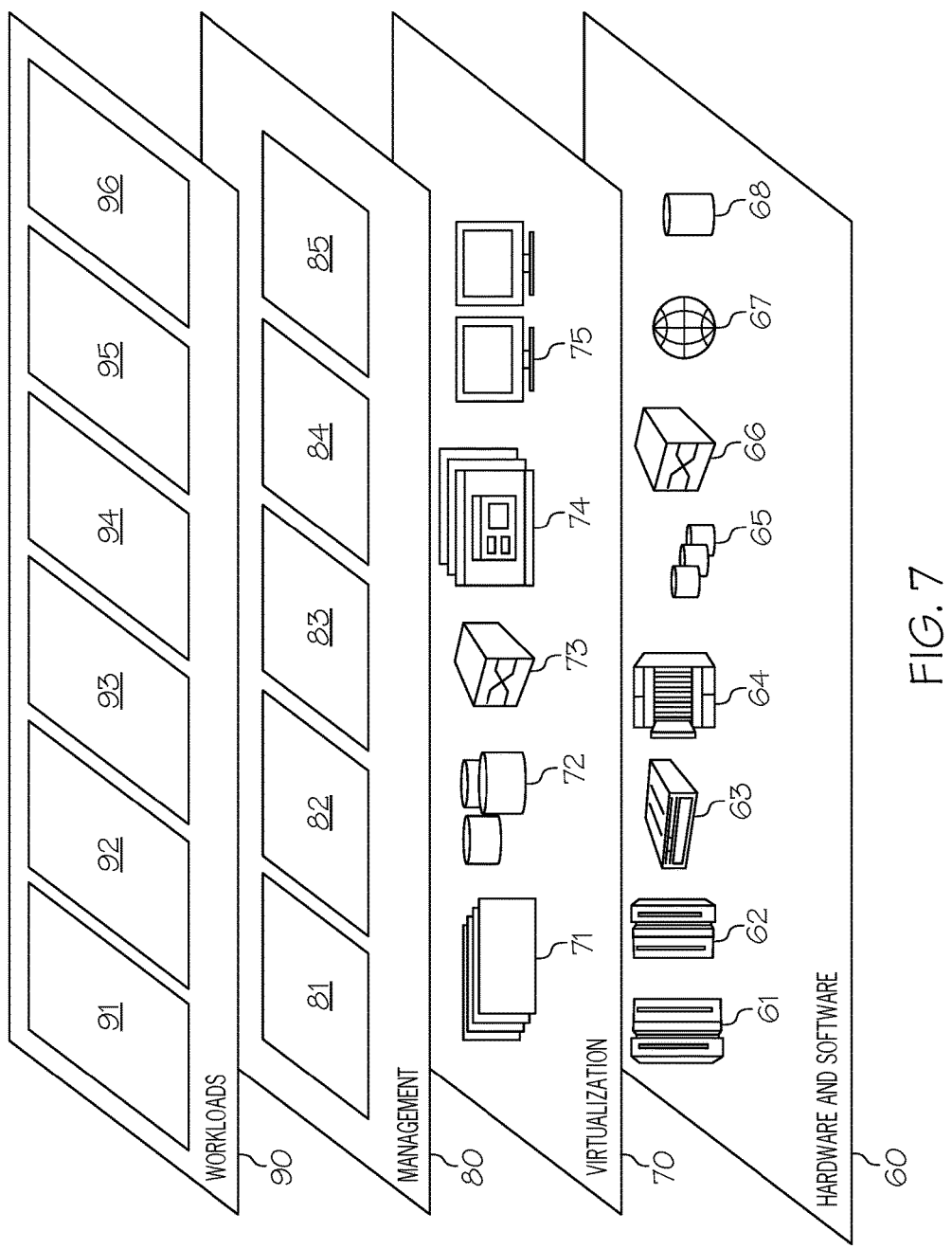
FIG. 7 depicts abstraction model layers of a cloud computing environment according to an embodiment of the present invention.

Referring now to FIG. 7, an exemplary set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video augmentation processing 96, which can perform one or more features of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Methods described in the present invention may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. By way of further example (only), one or more computer-implemented (e.g., in software) methods described herein may be emulated by a hardware-based VHDL program, which can then be applied to a VHDL chip, such as a FPGA.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
   transmitting, from a video augmenting computer to multiple reviewing computers, a video and a request for one or more snippets created by video reviewers who are using the multiple reviewing computers to view the video, wherein the one or more snippets provide additional information about one or more video passages in the video, and wherein the request also requests that each video reviewer include a video reviewer profile when returning the one or more snippets;
   receiving, by the video augmenting computer, one or more responses to the request, wherein each of the one or more responses comprise the one or more snippets and the video reviewer profile for a video reviewer that created each of the one or more snippets;
   receiving, by the video augmenting computer and from a new viewer, a new request to view the video along with a new viewer profile;
   comparing, by the video augmenting computer, video reviewer profiles associated with the one or more snippets to the new viewer profile;
   in response to the new viewer profile matching a video reviewer profile associated with the one or more snippets, augmenting, by the video augmenting computer, the video with the one or more snippets to create an augmented video; and
   transmitting, from the video augmenting computer to a client computer associated with the new request, the augmented video.

2. The computer-implemented method of claim 1, wherein the one or more snippets is a first snippet, and wherein the computer-implemented method further comprises:
   associating, by one or more processors, an identifier with the video;
   receiving, by the video augmenting computer, a second snippet that matches the identifier of the video and the new viewer profile of the new viewer of the video, wherein the second snippet provides additional information about the particular passage from the video, and wherein the second snippet is received from a second remote video reviewing computer;
   further augmenting, by the video augmenting computer, the augmented video based on the second snippet, to create a further augmented video; and
   transmitting, from the video augmenting computer to the client computer, the further augmented video.

3. The computer-implemented method of claim 2, wherein said further augmenting, by the video augmenting computer, the augmented video based on the second snippet, to create a further augmented video, further comprises:
   further augmenting, by the video augmenting computer, the augmented video by replacing the first snippet with the second snippet to create a further augmented video.

4. The computer-implemented method of claim 1, wherein the one or more snippets are text that provides additional information about a particular passage from the video.

5. The computer-implemented method of claim 1, wherein the one or more snippets are links to another video that provides additional information about a particular passage from the video.

6. The computer-implemented method of claim 1, wherein the one or more snippets are generated in response to the first remote video reviewing computer pausing the video at the particular passage.

7. The computer-implemented method of claim 1, wherein the one or more snippets are generated in response to one or more of the multiple remote video reviewing computers rewinding the video at the particular passage.

8. The computer-implemented method of claim 1, wherein the one or more snippets are generated in response to one or more of the multiple remote reviewing computers repeating the video at the particular passage.

9. A computer program product, comprising a computer readable storage device having program instructions embodied therewith, the program instructions readable and executable by a computer to:

transmit, from a video augmenting computer to multiple reviewing computers, a video and a request for one or more snippets created by video reviewers who are using the multiple reviewing computers to view the video, wherein the one or more snippets provide additional information about one or more video passages in the video, and wherein the request also requests that each video reviewer include a video reviewer profile when returning the one or more snippets;

receive, by the video augmenting computer, one or more responses to the request, wherein each of the one or more responses comprise the one or more snippets and the video reviewer profile for a video reviewer that created each of the one or more snippets;

receive, by the video augmenting computer and from a new viewer, a new request to view the video along with a new viewer profile;

compare video reviewer profiles associated with the one or more snippets to the new viewer profile;

in response to the new viewer profile matching a video reviewer profile associated with the one or more snippets, augment the video with the one or more snippets to create an augmented video; and transmit, from the video augmenting computer to a client computer associated with the new request, the augmented video.

10. The computer program product of claim 9, wherein the one or more snippets is a first snippet, and wherein the program instructions are further readable and executable by the computer to:

associate an identifier with the video;

receive, by the video augmenting computer, a second snippet that matches the identifier of the video and the new viewer profile of the new viewer of the video, wherein the second snippet provides additional information about the particular passage from the video, and wherein the second snippet is received from a second remote video reviewing computer;

further augment the augmented video based on the second snippet, to create a further augmented video; and transmit, from the video augmenting computer to the client computer, the further augmented video.

11. The computer program product of claim 9, wherein the one or more snippets are text that provides additional information about a particular passage from the video.

12. The computer program product of claim 9, wherein the one or more snippets are links to another video that provides additional information about a particular passage from the video.

13. The computer program product of claim 9, wherein the one or more snippets are generated in response to the first remote video reviewing computer pausing the video at the particular passage.

14. The computer program product of claim 9, wherein the program instructions are executed as a service in a cloud environment.

15. A computer system comprising:
one or more processors;
one or more computer readable memories, operably coupled to the one or more processors, wherein the one or more computer readable memories store program instructions for execution by at least one of the one or more processors, the stored program instructions comprising:

program instructions to transmit, from a video augmenting computer to multiple reviewing computers, a video and a request for one or more snippets created by video reviewers who are using the multiple reviewing computers to view the video, wherein the one or more snippets provide additional information about one or more video passages in the video, and wherein the request also requests that each video reviewer include a video reviewer profile when returning the one or more snippets;

program instructions to receive one or more responses to the request, wherein each of the one or more responses comprise the one or more snippets and the video reviewer profile for a video reviewer that created each of the one or more snippets;

program instructions to receive, from a new viewer, a new request to view the video along with a new viewer profile;

program instructions to compare video reviewer profiles associated with the one or more snippets to the new viewer profile;

program instructions to, in response to the new viewer profile matching a video reviewer profile associated with the one or more snippets, augment the video with the one or more snippets to create an augmented video; and program instructions to transmit, to a client computer associated with the new request, the augmented video.

16. The computer system of claim 15, wherein the one or more snippets is a first snippet, and wherein the stored program instructions further comprise:

program instructions to associate an identifier with the video;

program instructions to receive a second snippet that matches the identifier of the video and the new viewer profile of the new viewer of the video, wherein the second snippet provides additional information about the particular passage from the video, and wherein the second snippet is received from a second remote video reviewing computer;

program instructions to further augment the augmented video based on the second snippet, to create a further augmented video; and program instructions to transmit, to the client computer, the further augmented video.

17. The computer system of claim 15, wherein the one or more snippets are text that provides additional information about a particular passage from the video.

18. The computer system of claim 15, wherein the one or more snippets are links to another video that provides additional information about a particular passage from the video.

19. The computer system of claim 15, wherein the one or more snippets are generated in response to the first remote video reviewing computer pausing the video at the particular passage.

20. The computer system of claim 15, wherein the program instructions are executed as a service in a cloud environment.

* * * * *